United States Patent [19]

Webersik

[11] 4,314,759
[45] Feb. 9, 1982

[54] PLATE ELEMENT FOR HOLDING AN ORIGINAL, IN A REPRODUCTION DEVICE

[75] Inventor: Heinz Webersik, Munich, Fed. Rep. of Germany

[73] Assignee: AGFA-Gevaert Aktiengesellschaft, Leverkusen, Fed. Rep. of Germany

[21] Appl. No.: 116,873

[22] Filed: Jan. 30, 1980

[30] Foreign Application Priority Data

Feb. 23, 1979 [DE] Fed. Rep. of Germany ....... 2907037

[51] Int. Cl.³ .............................................. G03B 27/62
[52] U.S. Cl. ........................................ 355/75; 355/11
[58] Field of Search ....................... 355/75, 133, 11, 8; 16/190

[56] References Cited

U.S. PATENT DOCUMENTS 3,957,370  5/1976  Vola .................................. 355/75 X
4,009,954  3/1977  Ritzerfeld ........................ 355/75 X

*Primary Examiner*—Richard A. Wintercorn
*Attorney, Agent, or Firm*—Michael J. Striker

[57] ABSTRACT

An original holding plate element for a reproduction device has a flexible body part with a lower surface facing toward an original, and a white paper layer which has an inner surface facing toward and connected with the lower surface of the body part, and an outer surface facing away of the same and lined with a pellucid synthetic plastic foil.

7 Claims, 1 Drawing Figure

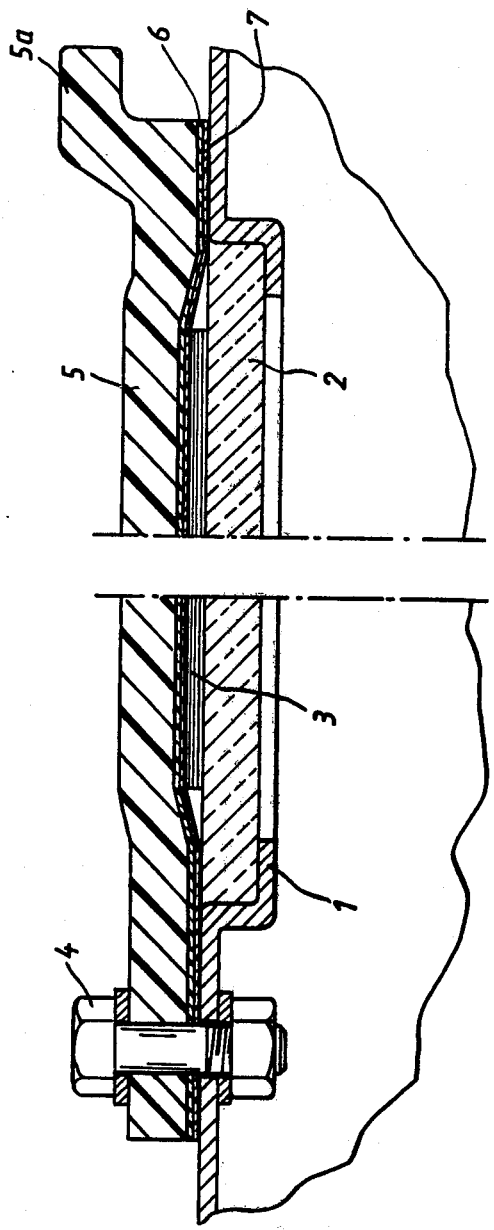

PLATE ELEMENT FOR HOLDING AN ORIGINAL, IN A REPRODUCTION DEVICE

BACKGROUND OF THE INVENTION

The present invention relates to a plate element for holding an original in a reproduction device. More particularly, it relates to such a plate element which is provided with light and reflecting upper face at its surface facing toward the original.

A plate element for holding originals, of the above-mentioned general type is known in the art. For example, such a plate element is disclosed in the German Patent No. 2,027,990 and serves for holding an original on a transparent original supporting plate of a copying device during the copying process. The lower side of the holding plate must have an upper face which is as pure white and highly reflective as possible, in which case it comes in its outer appearance as close as possible to the paper upper face of the originals which are to be copied. Such a construction guarantees, on the one hand, that the reproduction of the original has no dark edges when the borders of the transparent supporting plate not exactly coincide with the outer edge of the original, as generally takes place. On the other hand the pure white highly reflective holding plate makes possible to produce clean copies from thin or translucent originals with pure white substratum.

In addition to the required reflection properties, the lower side of the original holding plate element must be paint repellent and dirt repellent. This is necessary in order to prevent dirtying of the plate element during the contact with remains of paint on the original, such as ball pin paste, copying paint, felt pin paste, spirit duplicator ink, etc.

The body of the holding plate, from aesthetical and also from practical considerations, must not be pure white, but instead, it must have relatively dark paint, and the material requirements to the body proper are different as compared with the requirements made to the lower side of the holding plate. For this reason, the original holding plate is often composed of several layers, wherein the body of the holding plate is constituted of polyvinylchloride or rubber, and a white synthetic plastic foil is glued to the lower side of the body. However, the synthetic plastic foil utilized for obtaining the above-mentioned properties must have a relatively high contents of filler which is not sufficiently dirt repellent as a rule and is relatively difficult to connect with the polyvinylchloride layer or rubber layer of the holding plate body proper. In the case when, despite the higher contents of the filler, the foil has sufficient paint repellent properties, it is in practice very difficult to adhere and moreover has a relatively high rigidity which makes difficult manipulation of the original holding plate.

SUMMARY OF THE INVENTION

Accordingly, it is an object of the present invention to provide a plate element for holding an original in a reproduction device, which avoids the disadvantages of the prior art.

In keeping with these objects, and with others which will become apparent hereinafter, one feature of the present invention resides, briefly stated, in a plate element in which the lower surface of the flexible body part is provided with a white paper which is lined with pellucid synthetic plastic foil.

In accordance with another advantageous feature of the present invention, the synthetic foil is constituted of polypropylene, and the paper layer is constituted of an at least partly synthetic paper.

In accordance with a further advantageous feature of the present invention, the paper layer is connected with the body part of the plate holding element of polyvinylchloride or rubber by a known glue, and the pellucid synthetic plastic foil is connected with the paper layer in known manner under the action of heat and pressure by means of a fusion glue, before the connecting of the paper layer to the body part of the holding plate.

When the original holding plate is constructed in accordance with the present invention, the above-mentioned functions are distributed over several layers. The paper-like reflecting outer face properties are actually attained by the paper layer which, in addition to this, can be easily connected with the polyvinylchloride or rubber of the body part of the holding plate, for example, by glueing. The protection of the sensitive outer face is performed by the lining pellucid polypropylene foil which is resilient and dirt repellent in optimum manner and can be provided in respective optical manner with a texture-like embossment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a view showing a section of an original holding plate for a reproduction device in accordance with the present invention.

DESCRIPTION OF PREFERRED EMBODIMENTS

A reproduction device with which an original holding plate in accordance with the present invention is to be utilized, has a housing upper part and a transparent supporting plate 2 which is embedded in the housing upper part 1 and serves for supporting an original 3. A plate element for holding the original is mounted in the housing upper part 1 by means of screws 4.

The plate element has a body part which is identified by reference numeral 5. The lateral edge of the body part which is spaced from the mounting screws 4 is formed as a gripping projection 5a. The plate element must join the original 3 as close as possible, and is constituted of polyvinylchloride or rubber. The polyvinylchloride or the rubber is of a dark colour such as a grey colour. Thereby, the manipulation of the plate element leaves minimum visible traces.

The body part 5 of the plate element has a lower surface facing toward the original 3. A paper layer 6 is provided on the above-mentioned lower surface. The paper layer 6 may be glued to the body part 5 of the plate element. The paper layer 6 is lined with a thin pellucid foil 7. The foil 7 is advantageously constituted of an at least partly synthetic paper which has especially high rigidity and reflection properties and the side-edges of which cannot easily be penetrated by humidity. The paper layer 6 is glued on the body part 5 of the plate element by means of a glue which is generally utilized for glueing paper on polyvinylchloride or rubber. For example, cautchuck contact glue may be utilized.

The foil 7 is constituted of a pellucid synthetic plastic material, such as polypropylene. The foil 7 is connected with the paper layer 6 by means of a known lining process, before the glueing of the paper sheet 6 onto the body part 5 of the plate element. The foil 7 is joined with the paper layer 6 under the action of heat and pressure by means of a fusion glue. Ethylene vinyl acetate-copolymer meltable at the temperatures between 150° and 160° C. or a thermoplast on polyamide basis may be utilized as the above-mentioned fusion glue.

It will be understood that each of the elements described above or two or more together, may also find a useful application in other types of constructions differing from the types described above.

While the invention has been illustrated and described as embodied in a plate element for holding an original, of a reproduction device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A plate element for holding an original in a reproduction device, comprising a flexible body part having a lower surface facing toward an original; and means forming a light-colored upper reflecting face on said lower surface of said body part, said forming means including a light-reflecting white paper layer which has an inner surface facing toward and connected with said lower surface of said body part, and an outer surface facing away from the same and lined with a pellucid synthetic plastic foil.

2. A plate element as defined in claim 1, wherein said synthetic foil is constituted of polypropylene.

3. A plate element as defined in claim 1, wherein said paper layer is constituted of at least partly synthetic paper.

4. A plate element as defined in claim 1; and further comprising an adhesive layer located between said paper layer and said body part and connecting the former with the latter.

5. A plate element as defined in claim 4, wherein said body part is constituted of polyvinylchloride.

6. A plate element as defined in claim 4, wherein said body part is constituted of rubber.

7. A plate element as defined in claim 4; and further comprising a fusion adhesive layer located between said pellucid synthetic plastic foil and said paper layer and connecting the former with the latter under the action of heat and pressure, before connecting said paper layer with said body parts.

* * * * *